United States Patent [19]

Poelstra

[11] Patent Number: 5,166,878

[45] Date of Patent: Nov. 24, 1992

[54] METHOD AND APPARATUS OF COMPUTER AIDED SURVEYING FOR OBTAINING DIGITAL, 3D TOPOGRAPHIC INFORMATION

[76] Inventor: Theo J. Poelstra, Klokkengietershoeve 104, 7326 SC Apeldoorn, Netherlands

[21] Appl. No.: 504,848

[22] Filed: Apr. 5, 1990

[30] Foreign Application Priority Data

Apr. 7, 1989 [NL] Netherlands .................. 8900867

[51] Int. Cl.$^5$ .................. G01C 7/04; G01C 11/02
[52] U.S. Cl. .................. 364/424.01; 364/424.04; 364/443; 73/146
[58] Field of Search .................. 354/94–99, 354/112, 113; 364/424.04, 443, 449, 456, 424.01; 360/5; 73/146

[56] References Cited

U.S. PATENT DOCUMENTS

| 3,376,381 | 4/1968 | Ratliff, Jr. | 354/94 X |
|---|---|---|---|
| 3,608,458 | 9/1971 | Ratliff, Jr. | 354/113 |
| 4,147,419 | 4/1979 | Boyan | 354/66 |
| 4,689,748 | 8/1987 | Hofmann | 364/456 |
| 4,802,757 | 2/1989 | Pleitner et al. | 356/2 |
| 4,876,651 | 10/1989 | Dawson et al. | 364/449 |
| 4,891,761 | 1/1990 | Gray et al. | 364/452 |
| 4,891,762 | 1/1990 | Chotiros | 364/456 |
| 4,994,971 | 2/1991 | Poelstra | 364/424.04 |

Primary Examiner—Parshotam S. Lall
Assistant Examiner—Collin W. Park
Attorney, Agent, or Firm—Edmund M. Jaskiewicz

[57] ABSTRACT

Method of surveying for the compilation of digital files of detailed, three-dimensional, topographic data, consisting of co-ordinates of points in the terrain and the corresponding topographic point codes, line codes and plane codes 1. From at least three successive station positions, either photographically or electronically panoramic recordings are made of the terrain surrounding each station position. Each recording contains the entire horizon, from the zenith to far under the horizon, so that a sequence of recordings are obtained. Compared to the local horizon-plane, the spatial directions are determined of points in the terrain to-be-defined using measurement means and calculation means, which allow the determination with high precision, of the distance between the center of the recording and points to-be-defined in co-ordinates and of the direction of the line between the center of the recording and the point to-be-defined in relation to a fixed orientation taken at random in that recording. Special measuring instruments are used.

7 Claims, 12 Drawing Sheets

▲ KNOWN POINT
○ POINT TO-BE-DEFINED

▲ KNOWN POINT
○ POINT TO-BE-DEFINED

▲ KNOWN POINT
□ TRAINGULATION POINT (EVT. DETAIL POINT)
○ DETAIL POINT
✶ STATION RECORDING INSTRUMENT

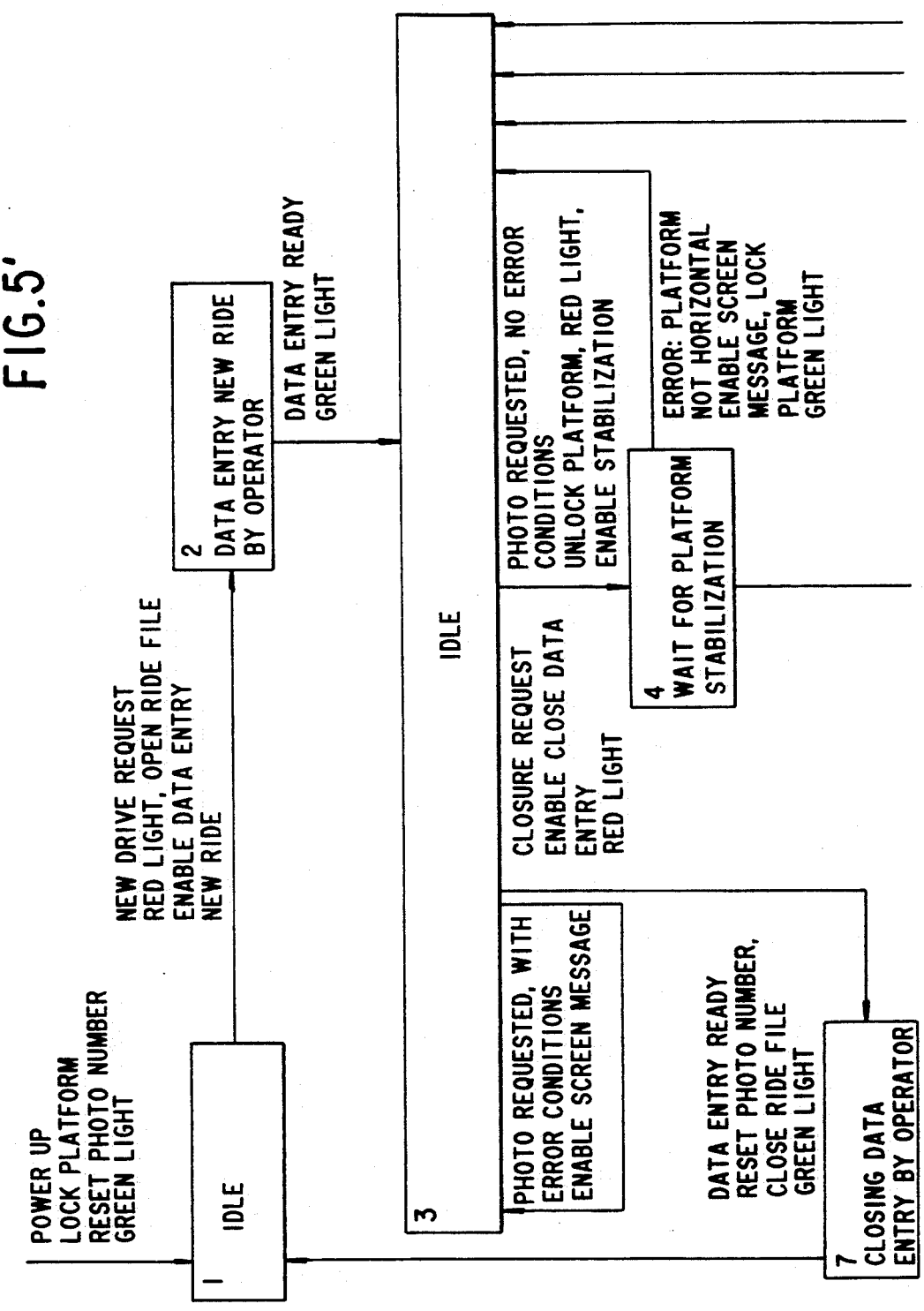

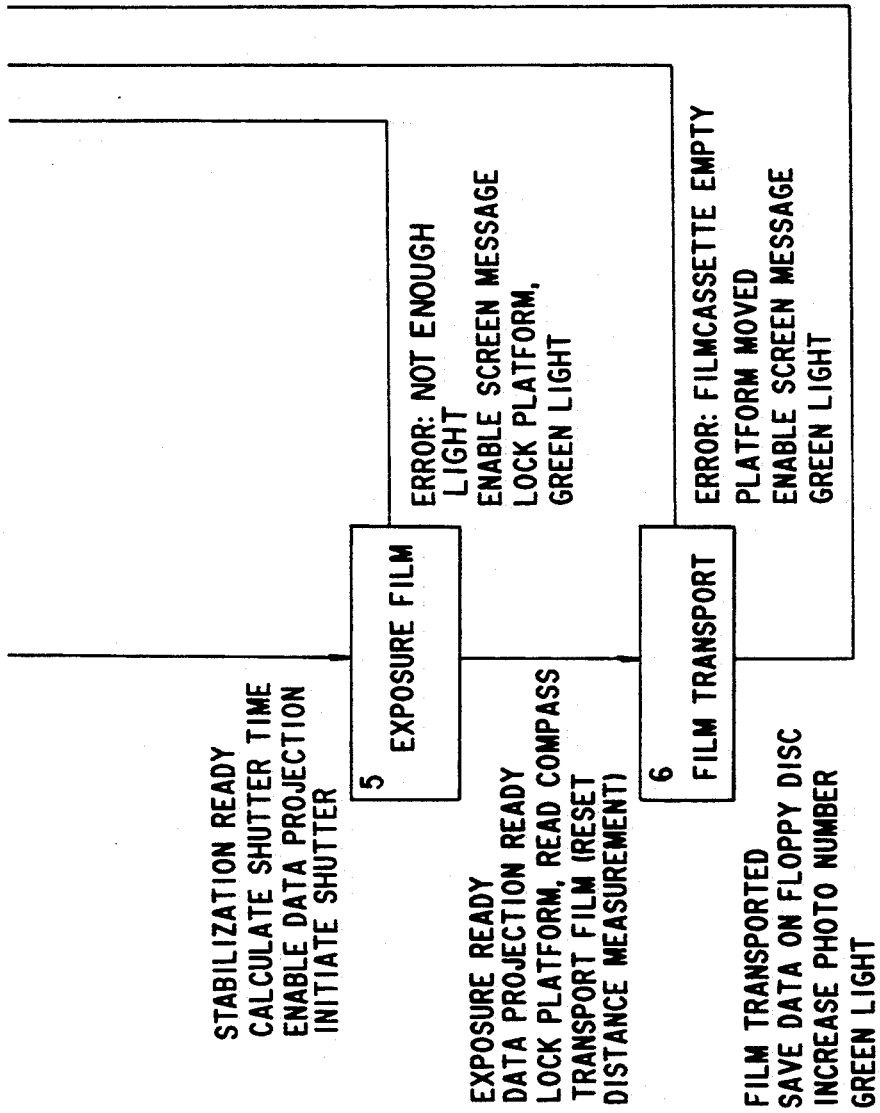
FIG.5"

| RECORD NUMBER | POINT CODE | TOPOGRAPHIC CODE | IDEALISATION CODE | PHOTO NR. 1 | MEASUREMENTS ||||
|---|---|---|---|---|---|---|---|---|---|
| | | | | | $r_1$ | $\varphi_1$ | PHOTO NR. 2 | $r_2$ | $\varphi_2$ |

FIG.9

METHOD AND APPARATUS OF COMPUTER AIDED SURVEYING FOR OBTAINING DIGITAL, 3D TOPOGRAPHIC INFORMATION

The invention relates to a method, at the disposal of surveying, for the compilation of digital files of a detailed, three-dimensional, topographic data, consisting of co-ordinates of points in the terrain and the corresponding topographic point codes, line codes and plane codes.

The last few years has seen a clear increase in the demand for land information in urban areas; land information being defined as very detailed topographic information which continually relates to small geographic units, such as lots, parcels, section of streets, etc. and land information also being defined as information concerning detailed units themselves (among others the topography) and thematical information which is connected to these units.

This information is a necessity for housing, building-policy, town renewal projects, mapping of utilities, real estate tax, spatial management (road-, green-management), construction of big civil-technical works, and other land uses.

The aim of the invention is to adapt to the increasing demand by an increase in automation, by which better databases can be built and the information can be supplied quickly. An important element of the land information is the detailed topographic information, i.e. the (graphic, geometric) description of the terrain with all its natural and artificial objects. The problems which occur in supplying this information are the following:

in the course of time the methods for collecting the data are not changed in principal;

the presentation of the information has always remained two-dimensional. This despite the fantastic technical possibilities which are at our disposal at the moment, such as interactive graphic screens in combination with powerful computer systems.

This aim has been achieved according to the invention by taking from at least three successive station positions, which do not have to be known in co-ordinates, either photographically or electronically panoramic recordings from the surroundings of each station position, the recordings containing the entire horizon, from the zenith to far under the horizon, so that a sequence of recordings are obtained and then, in a next step, compared to the local horizon-plane, the spatial directions are determined, starting from the station position towards each points in the terrain to-be-defined in co-ordinates using measurement means and calculation means, which allow the determination with high precision, of the distance between the centre of the recording and points to-be-defined in co-ordinates and of the direction of the line between the centre of the recording and the point to-be-defined in relation to a fixed orientation taken at random in that recording.

The system to-be-described here breaks through this impasse. By use of modern technical expedients a new method for collecting, processing and presenting topographic data has been developed. Thus, not only a new way of mapping becomes possible, but also the opportunity is created to present dynamic 3D images of built-up and unbuilt-on areas by use of these data. The existing techniques for this, aerial photogrammetry or the current terrestrial surveys, have their, rather big, disadvantages, both of a technical as well as a financial-economical nature.

Application of the existing terrestrial methods for these so-called detail surveys, such as e.g. tachometry, becomes more and more difficult in many cities, because of the increasing traffic and parked cars. Besides that especially the next points have to be known. This means that a rather extensive minor control survey has to be executed which asks for a strict organization. Every time at a survey prisms must be placed on the preceding and following minor control point. Especially in heavy traffic situations this part of the detail survey is an inconvenient circumstance. Moreover, the detail survey itself is very laborious and time-consuming, since at every detail point to-be-measured also a target (prism) has to be positioned.

This requires a large team of surveyors for which the organization of the measurement in the terrain is an essential part of the measurements. Such measurements become very expensive, if the team is inactive due to bad weather circumstances.

These disadvantages do not occur when the method to-be-described here of "Computer Aided Surveying" is applied. This method is characterized by being able to make outdoor recordings in a very fast way, after which the images thus collected are measured indoors. This new way of land surveying can preeminently be applied in urban areas, areas with small streets and high-rising buildings. In the process this method needs less preparation, works faster and more productive (fewer staff, less dependent from the weather) outdoors and supplied 3D database via indoor work (now 2D).

With this new system thus a very detailed 3D-database can be built-up. From them for example large-scale topographic maps can be generated in a range of 1:250–1:5,000, with a high precision.

Generally this system of "Computer Aided Surveying" aims for collecting detailed metric information in a modern, fast, inexpensive and very precise way and by the use of which among others topographic maps can be made.

SUMMARY OF THE INVENTION

Land surveying is concerned with the determination of relative positions of points on the earth's surface, in order to be able to give information concerning the location and size of geographic units. For this purpose almost every country has one or more systems of co-ordinates, so that via measurements of length and angles, co-ordinates of points can be calculated in those systems. This invention distinguishes itself of all the current methods because of the fact that measurements do not take place in the terrain, but indoors, on pictures. These pictures are representations of the terrain, and the measurements consist of recording certain quantities in these pictures, via the use of a computer.

By this new system "the reality among us" is recorded geometrically and three-dimensionally. The recording occurs by means of photographic shots, from which subsequent measurements are executed. Thus, the measurements are executed from photographic pictures in stead of reality itself.

The basic measurement principle is easy to explain if it is compared with the way in which we, human beings look to the 3D, reality around us. We do this with two eyes, which enables us to look at the surroundings in a spatial, i.e. three-dimensional way. Thanks to these two eyes we are, among other things, able to estimate distances and to see depth. Closing one of our two eyes makes the perception of depths impossible. This situation is comparable with the system of the invention. For, making a photograph is nothing more than representing the 3D reality on a 2D plane, the photo-plane. One dimension has been lost and thus it is not possible to reconstruct reality in an unequivocal way. To do this additional information is needed. This information is obtained by seeing to it that all points to-be-measured in the 3D reality are shown on at least two pictures. Thus we are able to calculate the 3D co-ordinates of all measurement points, which are important in the build up of a detailed topographic database.

The invention will be explained in greater detail with reference to the drawing. In the drawing shows:

FIG. 1: a block scheme of the entire system of surveying via image-measurement;

FIG. 2A: the geometrical set-up for intersection;

FIG. 2B: the geometrical set-up for extended intersection;

FIG. 2C: the geometrical set-up for the new system; a combination of intersection and resection;

FIG. 3A: the recording vehicle in an urban area;

FIG. 3B: an exploded view of the recording vehicle;

FIG. 4: a section of the recording-optics;

FIG. 5: a situation-diagram of the mobile system;

FIG. 6A: a recording on real-scale;

FIG. 6B: the part of a recording which is used for measurement;

FIG. 7: the elaboration system;

FIG. 8: the measurement procedure;

FIG. 9: an observation per point;

FIG. 10: the calculation process in phases.

In order to come to this data it is very important to have a fast and efficient recording, measurement and processing system by way of which the recordings can be processed to a digital database of co-ordinates and codes linked to them. The invention at issue contains such a system. FIG. 1 shows a schematic overview of the build up of the main parts of this system of "Computer Aided Surveying".

The recording system, see FIG. 3A consists of a car 1, a camera 2, a stabilizing system 5 and directing software. The camera is of the so-called fish-eye type. This means that when it is placed on the roof of a car, a surrounding picture 4 of the environment is made. On this the entire environment is to be seen, except for what is located in cone 3. Beside the car and camera, a stabilizing system is present by which during the recording sessions the camera is stabilized and the angle is read. The position data are important for the calculating procedure to-be-used which will eventually have to lead to 3D co-ordinates. Thus, the recording system supplies recordings and position data of the camera.

The measurement system, see FIG. 7, consists of a measurement unit 31, a microcomputer system 36 with two monitors 32 and 33 and directing software, in order to enable all subsystems to communicate and to have the measurements executed fast and efficiently by an operator, The measurement system is unique since with is all measurements can be executed at the office under conditioned circumstances instead of in the terrain. Measuring a point in two images can mathematically be formulated as executing a horizontal as well as a vertical measurement in the images. Besides corrections for lens-distortion, the software developed also takes care of on-line tests, i.e. during the measurement, to check if the point which is measured simultaneously in both images is measured sufficiently precise. Thus the measurement system supplies controlled and coded observations.

The central calculating system subsequently has to be able to process the large numbers of horizontal and vertical directions labelled by a code. This means that the directions in the end will have to be converted to 3D co-ordinates.

Regarding the high requirements for quality in principle more is measured than is strictly necessary. On the other hand this extra measurement is necessary, in order to be able to conduct statistic tests on the observation material (the directions) in a responsible manner. The central calculating system uses world-wide accepted adjustment and testing methods. Thus the calculating system supplies adjusted observations and from them calculated 3D co-ordinates, supplied with point identifier and topographic object code.

DETAILED DESCRIPTION OF THE SYSTEM AND THE WORKING-METHOD

The Geometric Measurement Plan

In order to be able to define the relative precision of points in the terrain, land surveying requires a good plan of the geometry that underlies it. Although at this new system the measurements do not take place in the terrain itself, but on pictures of the terrain, it still holds good, that at this method certain requirements for the geometrical measurement plan are operative, among other things in relation to aspects of quality. One could think of the so-called "strength of the figure" and the influence on the eventual precision of the co-ordinates.

Figure 1:
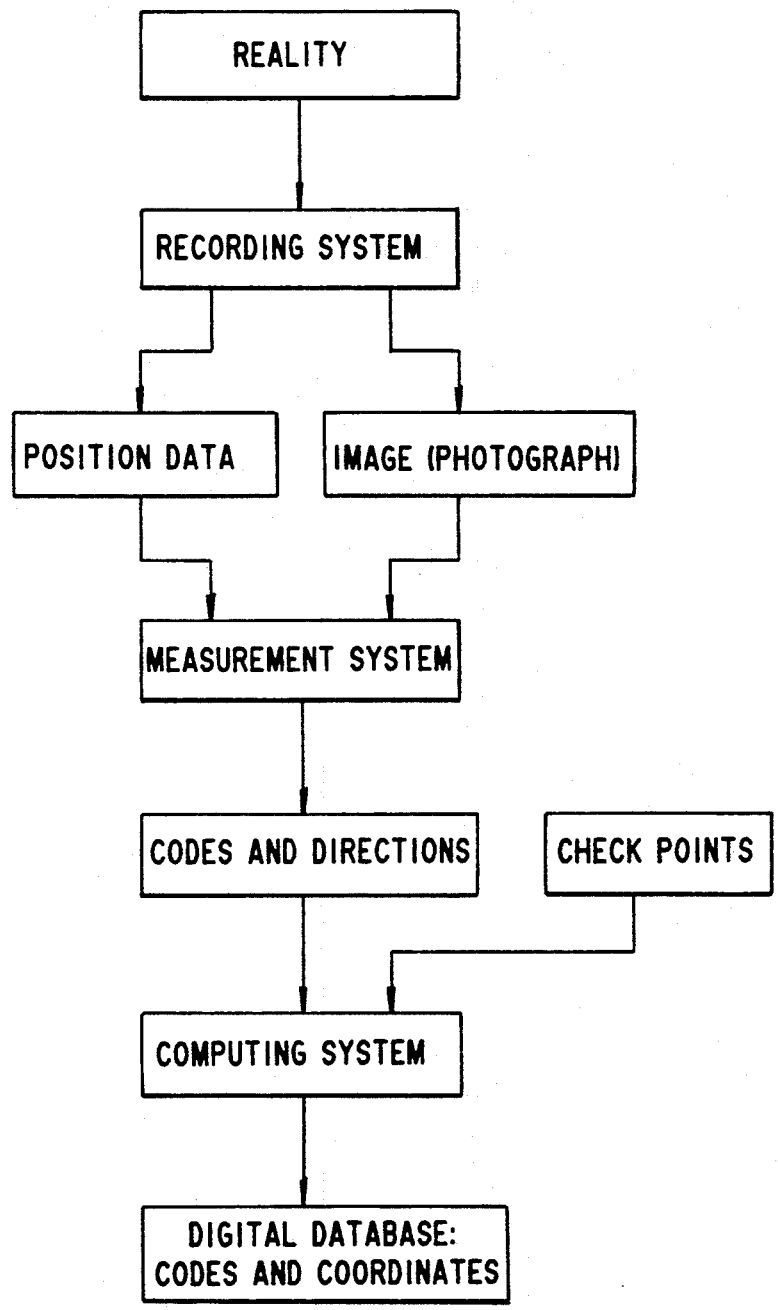
Figure 2A:
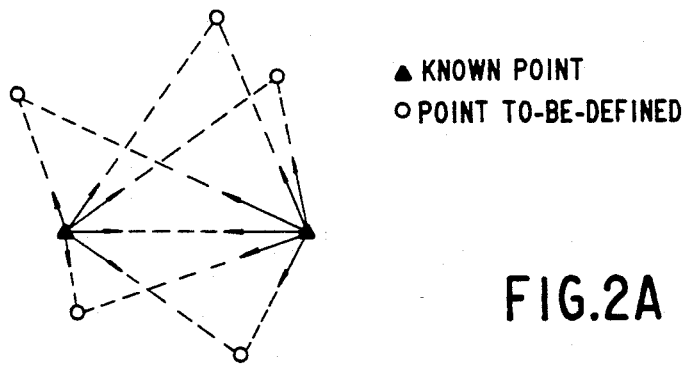
Figure 2B:
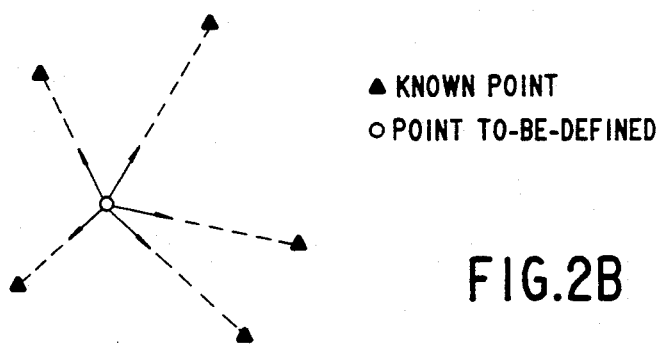

In order to define a point in co-ordinates the method of intersection can be applied, if two basic points are known in co-ordinates. In FIG. 2A this is shown. The observations are then formed by the four directions shown in the figure. In FIG. 2B it can be seen that in this way, so by observing directions, literally on the basis of two known points, many other points can be defined in co-ordinates.

Figure 2C:
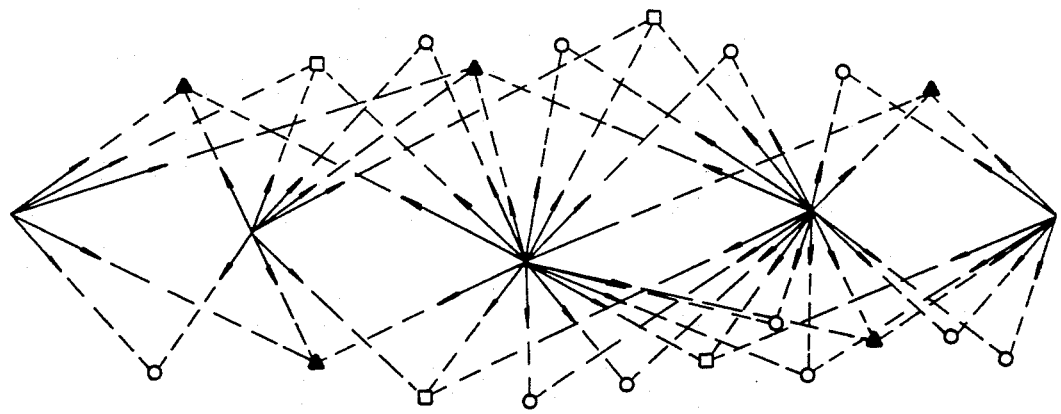

Then the question is how the co-ordinates of the basic points can be defined. The solution here lies in the application of the method of resection, as shown in FIG. 2C. Here also the shown directions form the observations. The points after which directions are measured in turn have to be defined in co-ordinates.

In the event that a street has to be mapped, in general not a great many points will beforehand be known. FIG. 2D, however, shows that they can be calculated in a correct geometric plan. Among others one condition is that points in the terrain occur various times on subsequent recordings. By means of the so-called triangulation points (points that occur on at least three recordings) geometric conditions arise. When the directions belonging to them can be measured, adjustment takes place and a network originates that has completely been defined for the directions. In order to be able to orientate this network in space and to fit it into space for scale in an absolute sense finally seven absolute co-ordinates are needed, for instance (X, Y, Z), (x, y, z) and a Z.

When a limited number of points is known beforehand, for instance from terrestrial or photogrammetric surveys, then by means of them other points can be defined in co-ordinates. In fact this measurement plan consists of the combined application of intersection and resection. Simultaneously during the measurements on the recordings, successively during the calculations.

The Recordings

Figure 3A:
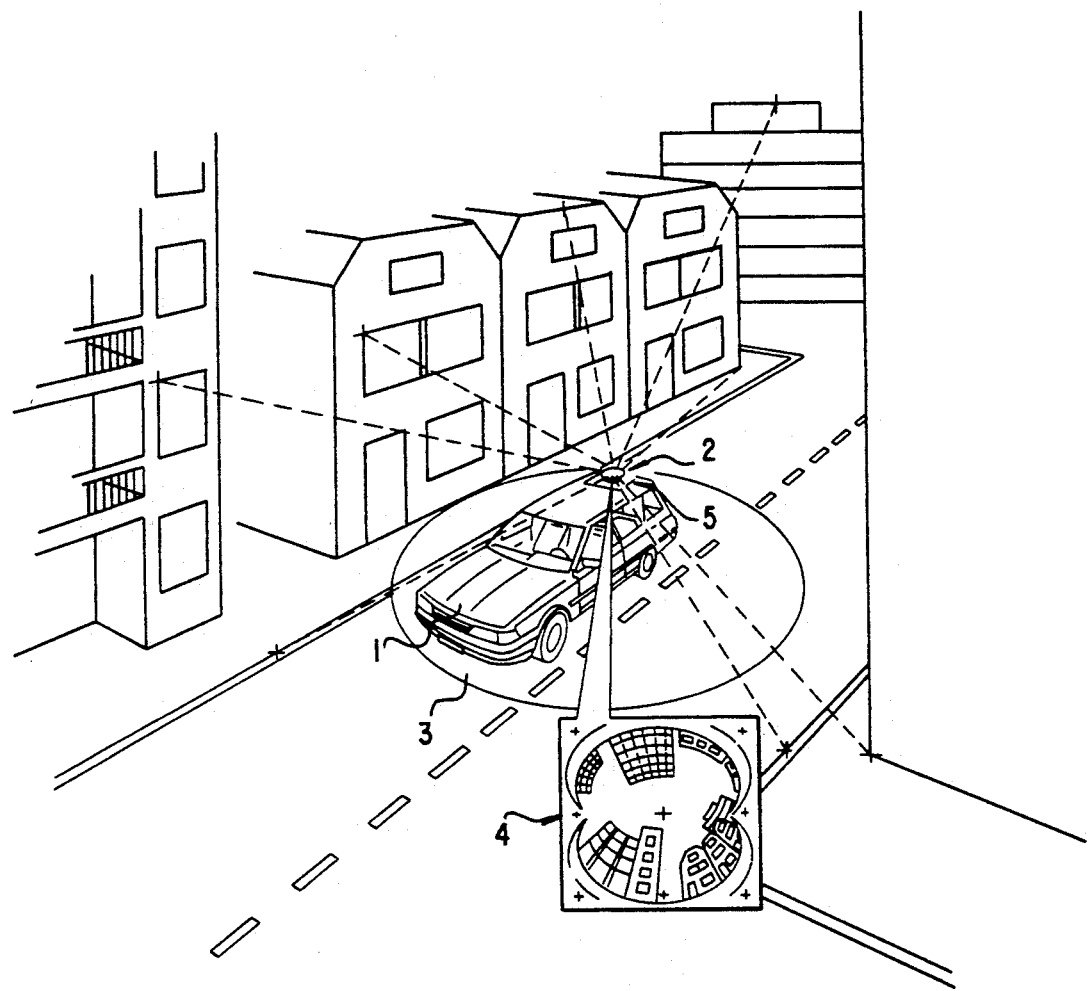
Figure 3B:
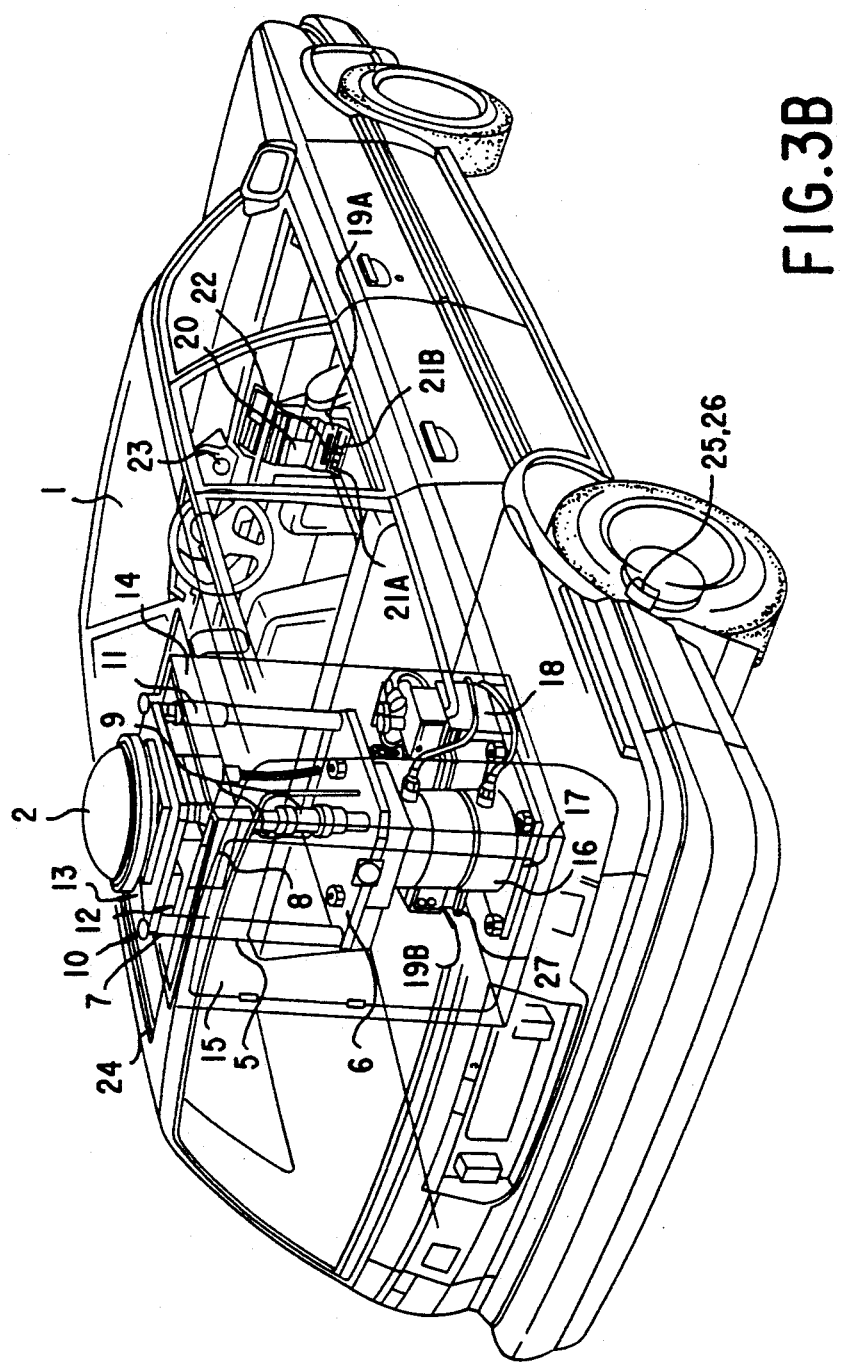
Figure 4:
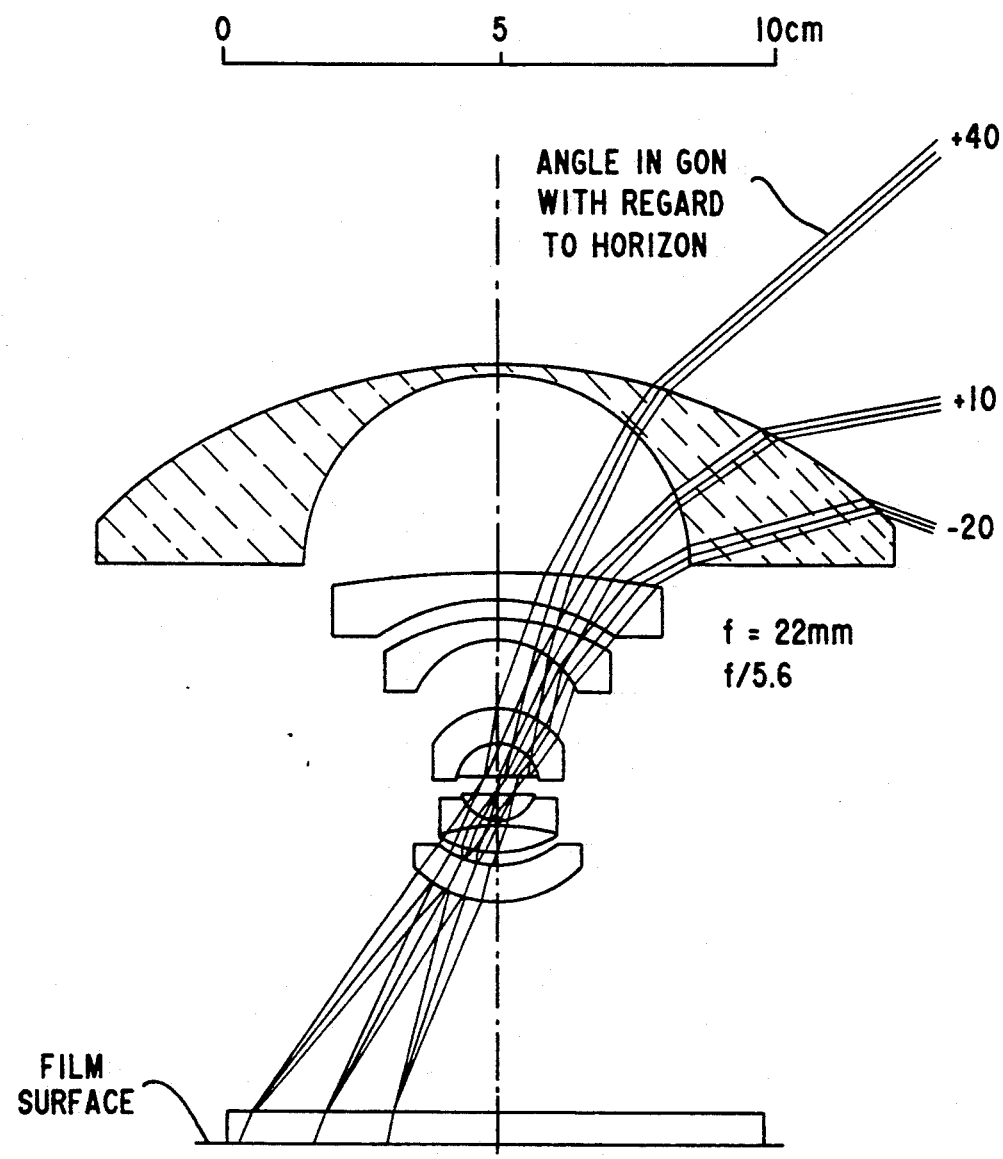

The camera 2 of the recording vehicle, see FIG. 3B, consists of a specially developed fish-eye lens, see FIG. 4. This camera is fitted up a stabilizing platform 5, that by way of a hydraulic unit 16 can be raised from the car, through the sunroof. This enables the camera to take pictures from a position only just above the car. The visual field is 400 gon (=360 degrees) horizontally, and from the zenith 120 gon vertically. Thus all kinds of points can be measured later, i.e. curbs and other street structures, facades, roof-projections, etc., etc., see FIG. 3A. The area in which the measurements on the photograph take place is part of the visual field, i.e. 40 gon above the horizon and 20 gon under it, round about. The optimum modulation transfer function is at 1 mrad. The inequality of the film is substantially smaller than 10 micrometers.

The stabilizing platform 5, see FIG. 3B, takes care of the fact that the vertical axis of the lens coincides as well a possible with the local vertical axis. This is achieved by the position sensors 12 and 13 and the servo-directed screw spindles 9, by a fixed turning point 10 and a telescopic axis with pressure spring 11. Thus the top-plate 7 is adjusted horizontally as well as possible in relation to the underplate 6 which by the hydraulic unit 16 and 17 is connected fast to the recording vehicle.

The horizontal position of the platform is important in relation to the following processing of the pictures taken. Beside the actual photographic image other data also have to be kept, such as a number of order, date and time of the recording, shutter-time, the orientation of the car, possible unbalance of the platform and the distance which has been driven in relation to the preceding recording. These data of a specific series of recordings which belong to each other are stored together in a file on floppy-disc 27 accompanied by a ride-number. A central computer 19A and 19B takes care of the total direction of the whole and the storage of the photographic data. The entire procedure for making one recording is done automatically by pressing a button on the recording-button 23 by the driver. On the monitor 20 of the computer 19A the driver can, if desired, follow the entire process and can also see if and why something goes wrong.

Via FIG. 5 the functioning of the mobile system 1 is to be explained as follows.

After the necessary preparations have been taken the ride to the recording area is made. While this is being made the platform 5 is locked and a green signal lamp 21A indicates that driving is allowed. The photograph-numbering is reset. The system is in a condition of rest 1 and is waiting for a "new ride request" of the operator.

When the car 1 arrives at the measurement area, the driver can initialize a new ride by pressing a function key on the keyboard of the computer. The driver is compelled to give a new ride-number to the computer and a new ride-file is opened. Also the computer asks if time and data are still correct. A correction of it is then possible. After the input of the ride-number the screen signal lamp 21A lights again to show that driving is allowed and the system returns to a condition of rest 3.

In condition 3 it is waiting for commands by the driver. The driver can now decide to make a recording ("photo request"). For this the driver presses button 23; the keyboard is not to be used for some time. If all conditions for taking a photograph are in order, then we go on to condition 4. The red signal lamp 21B is lit and from that moment on the vehicle is not to be moved anymore. The platform 5 is unlocked and the stabilization of the platform is started, the system remains in condition 4 until the platform has reached the horizontal position. Should the stabilization not be effective, then this is immediately shown via the monitor 20 and we return to condition 3.

When the stabilizing system reports that the platform is in a horizontal position, the possibly still present rest-inclination is read-out by the computer 19B, and directly after this the shutter-time is calculated. This shutter-time is also read-out by the computer. If there is not sufficient light than the recording is refused and we return to condition 3. This is reported to the driver directly via monitor 20. When there is sufficient light in condition 5 the shutter is opened. At the same time both date and time are projected and also read-out by computer 19B.

When the film-exposure time is over we go to condition 6. The platform 5 is again locked and the film in cassette 8 is automatically transported one picture further. At the same time the wheel-sensors 25 and 26 are read out which together with the photographic data mentioned before have to be stored on floppy-disc 27 in the open ride-file. Only in the case that the photograph which has just been taken was the first of the ride, the distance meters are reset to zero.

The distance meters always count on after the first recording during a ride, and are used as indicators for the moment on which another photograph has to be taken. For instance every 15 meters. They also serve for the calculation of the orientation(s-change) of the recording vehicle 1.

After condition 6 the film in cassette 8 is transported and is checked if the film might be entirely used. Is this the case than it is reported immediately to the driver via monitor 20. It may also be possible that the platform moved at the time of the recording. This is also reported to the driver via monitor 20. The driver is now offered the opportunity to re-take the photograph, in which case the photograph keeps the same number. In both cases we go to rest-condition 3, and the green signal lamp 21A lights again.

The driver may now, in condition 3, decide to take a photograph again, but as mentioned before, this will only be possible if all photographic conditions are correct. False conditions are directly reported on the monitor 20 and a warning-beep warns the driver about the message. Various false conditions are possible, the film is exposed, the route is not relevant, the car moves, insufficient light, the floppy-disc is full, etc. The driver can only ignore one of them, the one relating to the route. This message can be over-ruled by a function-key of the computer 19A.

In condition 3 the driver may also decide to close a ride. To do this he presses a function-key on the keyboard of the computer 19A. The red signal lamp 21B lights and this enables the driver in condition 7 to feed a commentary on the driven ride to the computer. This commentary may involve information about for instance the weather-conditions or deviations in the route. A maximum of 300 characters is possible. After this data input the ride-file is closed, the film-numbering is reset to zero and the green lamp 21A lights.

In this condition driving is permitted and the next photograph can be taken. Driving included, one cycle, i.e. one photograph, takes approximately 20-30 seconds. It is possible to take hundreds of photographs before the cassette has to be changed. Thus photographs and photographic data are produced, of which the latter consist of: the driven route, deviation concerning the vertical, shutter-time, orientation of the car, ride-code/photo-number/time/date.

The Measurements

Figure 6A:
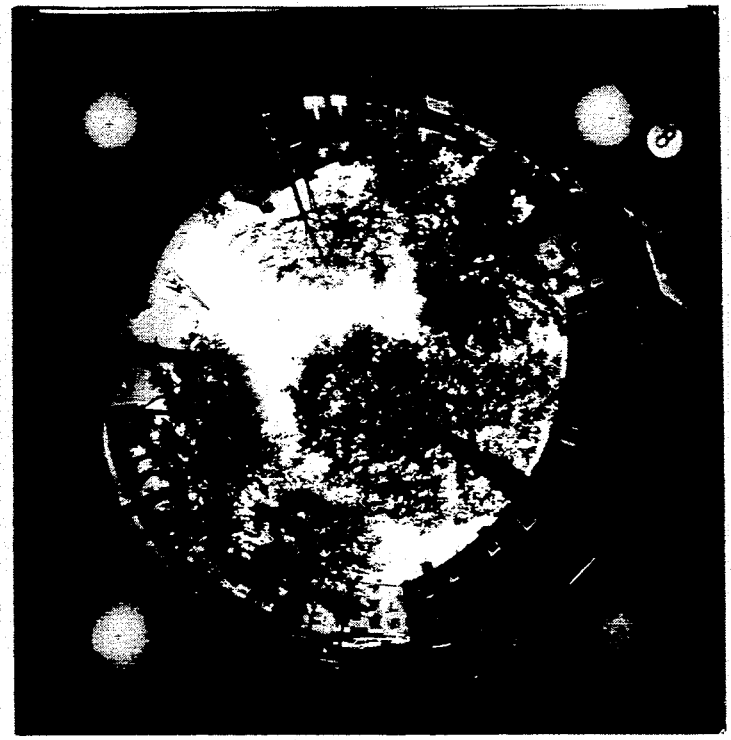
Figure 6B:
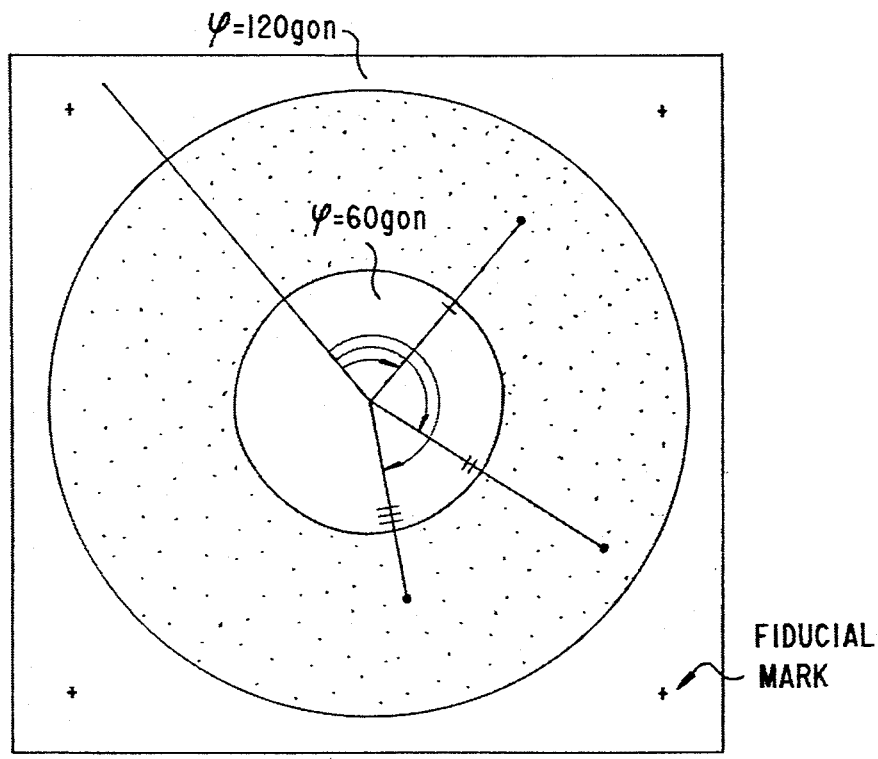

After in a part of a city a number of photographs have been taken in the way described, they are developed, etc. Then they are cut to the right size and the further preparation for the measurements is completed. The photographs are panoramic, i.e. they contain the entire horizon round about (400 gon) and go in a vertical sense from the zenith to 20 gon under the horizon, see FIG. 6A and 6B. In these photographs horizontal directions ($\phi$) agree with those in the terrain, and the height above the horizon in angle-size can be defined from the distance of the centre of the photograph to the measured points (r). By every time measuring the photographs two by two by way of searching for corresponding points, the principle of the geometric measurement plan can be followed, as shown before.

Figure 7:
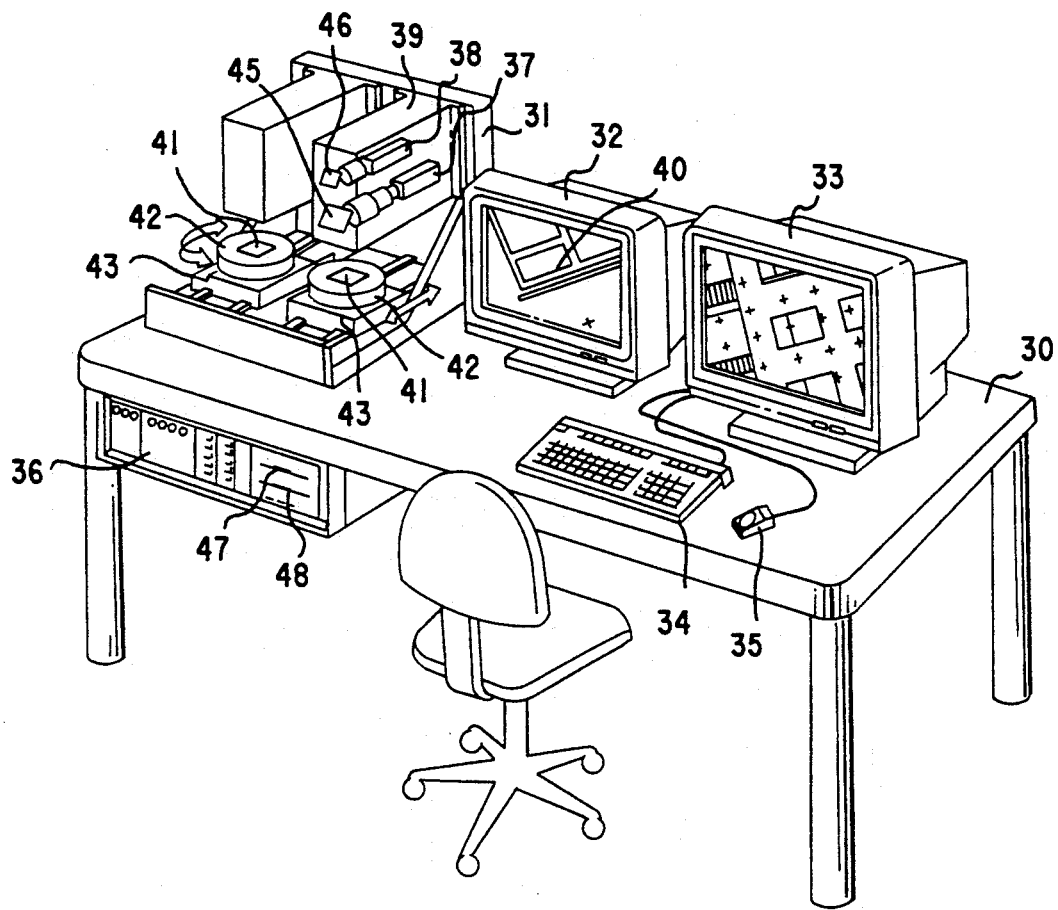

For this purpose a measuring instrument 31 is designed and built, as shown in FIG. 7. It is clear that two photographs are measured simultaneously, at which the format may be at a maximum of 100×100 m. Beside the two (illuminated) measurement tables 41 which can be rotated 42 and transferred 43 the instrument also contains four CCD matrix cameras with special lenses, two per measurement table 37 and 38 two monitors 32 and 33, back-ground memory, mouse 35 and keyboard 34, and this is all connected to a powerful PC/AT computer 36 working under OS2. Possibly in combination with an array processor, but in any case with a working-memory of 16 MB. Also an optical discunit is anticipated to serve as a back-ground memory. In the measurement-phase we work with images in 8-bits grey-tones, and in this phase we do not apply image-editing. In a later phase this emphatically is anticipated.

After the recordings have become available, the area measured per block of approximately 40-50 recordings. For this purpose diapositive pictures are used, which are put onto the measuring instrument 31 in the same way, two at a time. So measurement is stated with recordings 1 and 2, then 2 and 3, then 3 and 4, etc. etc. measurement is done by way of the measurement tables 41, which can be rotated 42 and transferred 43, in such a way that identical points that occur on two photographs and are important for the measurement, can be placed under the CCD measurement cameras in only one way, unequivocally. In the CCD measurement cameras 37, one per measurement table, we can find the measurement marks. Per photograph to-be measured the image concerned is visible on a separate screen 32, in black and white. This image covers an area on the photograph of 5×5 mm. Besides this the image of the measurement mark 40 is also visible, a fixed place of the screen. It is the case to put the point to-be-measured under the measurement mark.

Per measurement table 41 also a second camera 38 is available for the necessary overview images. These images cover an area of 50×50 mm on the photograph. The operator first looks for the identical points via these overview images and subsequently via switching to the measurement cameras executes the actual measurement. The route of the light 44 from the measurement table 41 is used by both the measurement camera 37 and the overview camera 38: separation takes place by a semi-transmitting mirror 45, in which case the overview camera is reached via mirror 46. On the measurement screen thus subsequently four images can be produced:

overview photograph 1, selection point, switch;
measurement photograph 1, definitive selection of position, switch;
overview photograph 2, switch;
measurement photograph 2, switch.

Switching when the measurement image is in correct position, means storing the measurement. This means the table positions in (r) and ($\phi$). As soon as a point code has been added, via a menu, the measurement is placed in a record.

The indication of identical points is done via a cursor on the screen. The cursor is placed on the point that has to be put under the measurement mark 40. After switching via the confirmation of the mouse 35, the measurement table quickly goes to the place desired. This is achieved via transformation of screen co-ordinates and comparison with the read-out of the actual position of the table, after which the differences are neutralized.

In order to be able to find the identical points in a right and quick way, on the second screen 33 the image which has been recorded last is shown. Thus one can, while manipulating photograph 1, use photograph 2 as a reference and vice versa. This is necessary to have the measurement of corresponding points in complicated images go in a fast manner. Thus the second screen serves, among other things, to help the operator to keep his overview. When identical points are looked for (most of the actions) every time the penultimate overview image is available.

Further on screen two 33 the image of photograph 2 is present at the moment that photograph 1 is changed (on the photographholder) for photograph 3. This is required because in this image the so-called triangulation points are indicated. These points, which have to be visible in at least three photographs, are in principle selected by a calculation programme, but the operator has to verify, if they actually occur on successive photographs. Furthermore other relevant data can be shown in this transitional image. Finally the second screen 33 has a third function for the measurement. To the measurement also a code has to be given, and this is done via the screen, in combination with the mouse 35 and a cursor, and in a menuprogramma.

In practice the measurement procedure begins with starting the pieces of apparatus 30, for instance in the morning. Then a reset procedure is executed. This consists of putting in the photographs always in the same way. On the photograph so-called fiducial marks are visible which are in the same way put into the photograph-holders. These photograph-holders themselves are every time in the same position on the measurement tables 41. When everything is thus positioned the electronic counters are reset to the zero position. This of course only has to be done at the start of a measurement day, or as soon as for instance a power failure has occurred.

When the reset procedure has been completed, administrative information is put in, among which the data of the floppy-disc in slot 47 in the computer 36, from the recording car. These data are the start of the records with observations, records which are registered per sub block.

Figure 8:
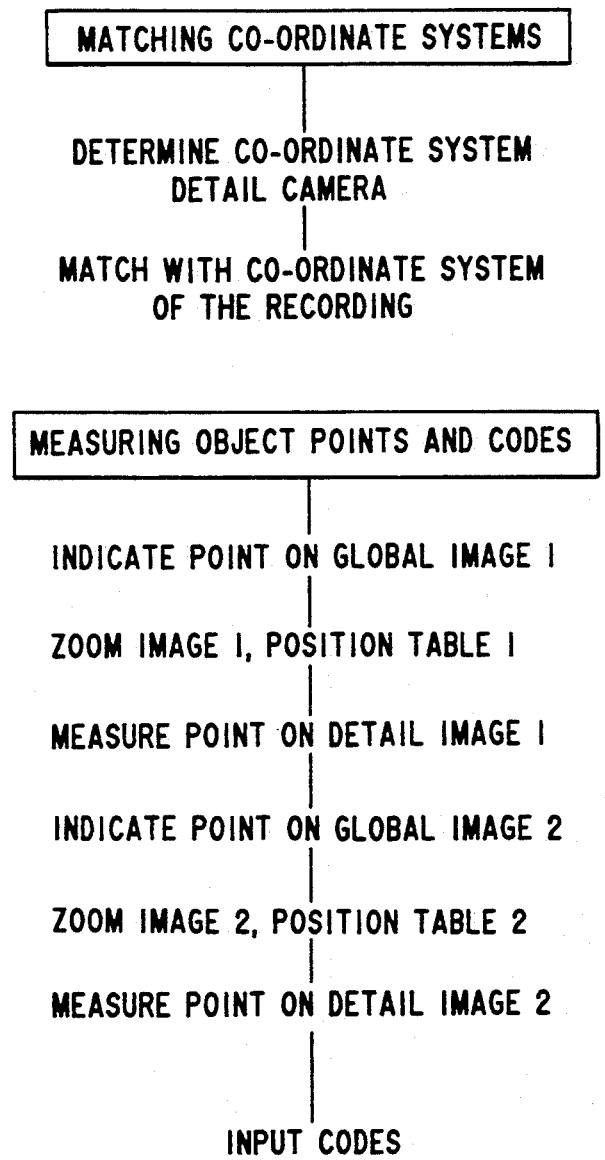

The measurements can start, during which it is tried to measure in one continual movement, so that little time is lost. The working method here is as described before, see also FIG. 8. After in this way a pair of photographs has been measured, after the application of calibration corrections and a conversion for spatial directions a check for grave errors in the measurements follows, if needed followed by an order to remeasure one or more points. These on-line corrections, calculations and checks are the first calculations, by the rough observation materials. As soon as everything the record concerned has been stored in the file of the sub-block concerned, also provisional co-ordinates become known, and photograph 3 can take the place of photographs 1, etc., etc.

Thus an entire sub block can be measured. This type of measurement can be executed very fast; it only takes approx. 30–45 seconds to define a point. When a sub block has been dealt with, the file in question is closed with relevant administrative information. Thus the photographs and the information of the floppy-disc from the car are elaborated to, per sub-block of 40 to 50 recordings, a file of observations of two sets of spatial directions (r) and ( ) and the object code per point, see also FIG. 9, completed by a file of provisional co-ordinates and the possible inclination during the recordings. This is all available via floppy slot 48 of the computer 36.

The Calculations

Figure 10:
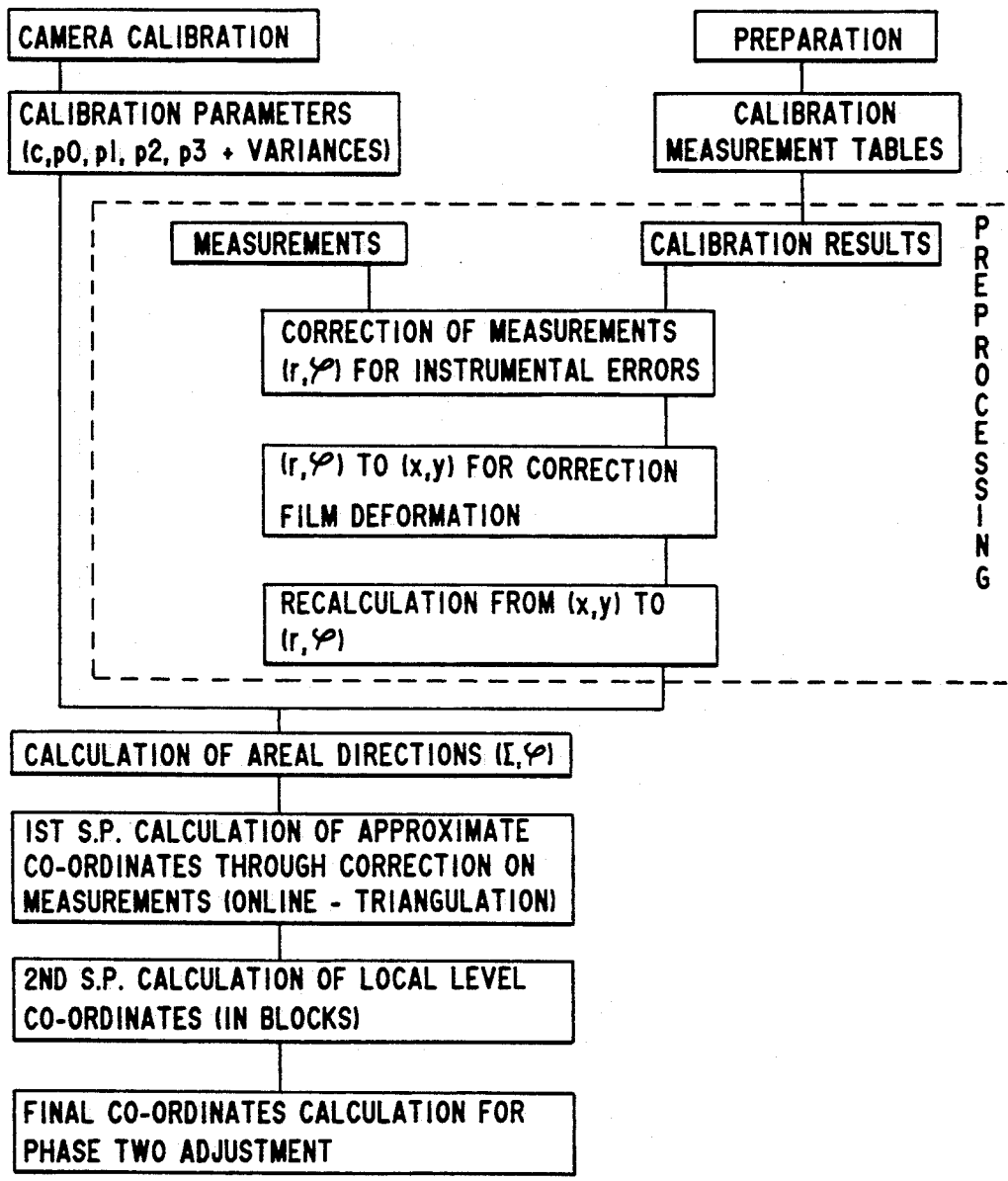

With the observations which have been collected a series of calculations is executed which are of a very complex nature. The cause lies among other things in the fact that the observations not only have a value, but also a so-called standard deviation and, perhaps, mutual relevance or correlation, all this shown via the so-called probability model. In order to have it all stay surveyable and practicable the calculation process is split up in a number of phases. For this see FIG. 10.

As mentioned before a part of the calculation process takes place during the measurement process. It actually is part of it. Other measurements and calculations even take place before the measurement process is done, they are those measurements and calculations which are part of the calibrations of respectively the camera and the measurement tables. For both these processes software has been developed which has been closely linked with the current measurement system 31, and so are part of it.

The results of the measurement table calibrations are applied per photograph, if necessary. This is done in the shape of corrections on the observation values (r) and ($\phi$). In this way these observations are corrected for instrumental errors. Subsequently the corrected observations (r') and ($\phi'$) are transformed to the camera axis-system, which is defined according to a number of so-called fiducial marks and/or reseau marks. Also a number of corrections is executed for lens-distortion. The data which are needed for this purpose are gathered via the camera-calibration procedures. After this conversion of the in this way corrected observations after spatial directions, i.e. per point observed two values ($\Sigma$) and ($\phi$), plus object-code etc., takes place. All this per photograph, as a part of the measurement process, as well as the checking-process for grace errors which takes place after this.

The latter process is actually an on-line adjustment process using the just now calculated spatial directions. This results in corrections to the directions and in the calculation of the co-ordinates by approximation, after introducing a scale. Thus the co-ordinates by approximation of the triangulation points and of the set up points (centre of the camera) from where the photographs were taken, besides the spatial directions of all the points observed, and so also of the so-called detail points, are known. Next an adjustment for the entire sub block is done, during which the co-ordinates of the triangulation points and the station positions are solved as unknowns. After all directions have been corrected, the co-ordinates of the detail points can also be determinated. Then with these process, after fitting this into a national system of co-ordinates, as it were a "cloud of points" in that system has been obtained, with a point code added to it per point.

Exploitation

The cloud of points (in (X,Y,Z)) mentioned before is converted via an editing process to a number of digital products. For instance on tape as base of a so-called plot-file in a certain format, by which of a certain area a very detailed map can be plotted by means of a computer directed plotter. Such a file is then sold at an agreed price per point on the map.

We can also think of other products, i.e. those in which the 3D nature is used via for instance 3D cartographic presentations. Dynamic simulations are also possible, as well as support of companies which manufacture aerial photogrammetric products.

The invention consists of a system, that as an application is international, and can be sold as such. So besides the exploitation of the invention via products mentioned before, the system itself can also be offered. Here a number of variations is possible via rent or leasing. All this for instance per country or per group of countries.

I claim:

1. A method of surveying for a compilation of detailed three-dimensional topographic data which consists of co-ordinates of a plurality of detail points on terrain and the corresponding topographic points on terrain and the corresponding topographic point codes comprising the steps of
   (a) scanning photographically or electronically from each of three successive station positions on the terrain surrounding said each station position to obtain a panoramic recording of the terrain but without determining the position of co-ordinates of the station positions, said panoramic recording subtending 360 degrees of the horizon and extending from a zenith above said each station through an angle in a vertical plane of at least 110 degrees, and a distance between two successive stations being such that each detail point occurs on at least two successive panoramic readings to obtain a sequence of recordings,
   (b) measuring on said panoramic recording an angle between a first line extending between the center of the recording and a detailed point to be defined and a second randomly selected fixed line extending through the center of the recording,
   (c) measuring on said panoramic recording a distance (r) between the center of the recording and said detail point, said distance (r) being a measure of the angle between a line extend to the station at the center of the recording and said detail point and horizontal plane through said station to determine an elevation of said detail point above the horizontal plane.

2. A method of claimed in claim 1 wherein said measuring steps comprise placing in each of two identical instruments one recording of two successive recordings such that each detailed point which is to be defined occurs on the two successive recordings and can be measured therefrom at the same time.

3. A method as claimed in claim 1 and the step of placing a camera for making a said panoramic recording such that the optical axis of the camera coincides with the vertical direction at the station from which the terrain is to be scanned whereby the camera is positioned in exactly the same position with respect to the vertical.

4. A method as claimed in claim 3 wherein said camera comprises a metric camera having a fish-eye lens and is fixed upon an adjustable stabilizing platform disposed at the top of a motor vehicle,
an adjusting the stabilizing platform prior to making a recording such that the optical axis of the camera coincides with the vertical at the situs where the recording is to be made.

5. A method as claimed in claim 4 and the step of recording fiducial marks on each of the four sides of each panoramic recording such that said marks serve to identically position the recordings during measuring.

6. A method as claimed in claim 2 wherein said two identical instruments comprise two identical measuring tables such that two successive recordings can be measured simultaneously whereby the co-ordinates of a point to be defined can be calculated.

7. A method as claimed in claim 6 wherein the co-ordinates of the point to be defined comprise a distance $()$ and an angle $\phi$ such that a point to be defined from each successive recording coincides with a fixed reference mark on both tables.

* * * * *